United States Patent [19]
Routson

[11] 3,809,160
[45] May 7, 1974

[54] IMPROVED METHOD FOR SELECTIVELY CONTROLLING FLOW OF AQUEOUS FLUIDS IN SUBTERRANEAN FORMATIONS

[75] Inventor: Willis G. Routson, Walnut Creek, Calif.

[73] Assignee: The Dow Chemical Company, Midland, Mich.

[22] Filed: Aug. 3, 1972

[21] Appl. No.: 277,765

Related U.S. Application Data

[63] Continuation-in-part of Ser. No. 44,609, June 8, 1970, Pat. No. 3,687,200.

[52] U.S. Cl.................................. 166/294, 166/295
[51] Int. Cl........................................... E21b 33/138
[58] Field of Search ........... 166/294, 295, 270, 300; 61/36 R

[56] References Cited
UNITED STATES PATENTS

| | | | |
|---|---|---|---|
| 3,611,733 | 10/1971 | Eilers et al..................... | 166/294 X |
| 3,581,824 | 6/1971 | Hurd................................. | 166/270 |
| 2,747,670 | 5/1956 | King et al. ........................... | 166/270 |
| 3,490,533 | 1/1970 | McLaughlin....................... | 166/270 |
| 3,614,985 | 10/1971 | Richardson...................... | 166/300 X |
| 3,658,129 | 4/1972 | Lanning et al...................... | 166/270 |
| 3,701,384 | 10/1972 | Routson et al.................. | 166/270 X |
| 3,730,272 | 5/1973 | Richardson et al............. | 166/300 X |

*Primary Examiner*—Stephen J. Novosad
*Attorney, Agent, or Firm*—J. Roger Lochhead

[57] ABSTRACT

A method for selectively reducing the flow of water in permeable subterranean formations by injecting into said formations a solution of a polyvalent metal ion followed by a solution or dispersion of an organic polymeric polyelectrolyte, thereby forming a stable colloidal dispersion of a water-insoluble inorganic solid in said water-containing formation in preference to its formation in oil-containing strata. This, then, results in improved oil recovery.

5 Claims, No Drawings

IMPROVED METHOD FOR SELECTIVELY CONTROLLING FLOW OF AQUEOUS FLUIDS IN SUBTERRANEAN FORMATIONS

This application is a continuation-in-part of my co-pending Application Ser. No. 44,609, filed June 8, 1970, now U.S. Pat. No. 3,687,200, and entitled "METHOD FOR CONTROLLING FLOW OF AQUEOUS FLUIDS IN SUBTERRANEAN FORMATIONS", said Application being herein incorporated by reference.

BACKGROUND OF THE INVENTION

The problems associated with the concurrent production of oil and water are well known. The presence of water in produced oil may be traced to any one or more of a number of different causes including water-coning, water-fingering and fractures communicating with water sources. In addition to the aforementioned causes of water production, which generally occur as the result of the mode of producing the well, water may be produced simply as the result of the oil well bore hole traversing water-bearing strata. Conditions conducive to water production are more fully illustrated in U.S. Pat. No. 3,032,499.

The mentioned patent is but one among many proposed treatments to block the water producing courses, leaving the oil-bearing formation in a condition such that oil production is readily resumed. In general, techniques heretofore proposed have suffered from one or more faults in that they were not sufficiently selective for the plugging of water courses, or they require for operation special conditions seldom encountered in actual practice. A further problem with prior methods results from the fact that they are either too permanent or not permanent enough, the former making mistakes uncorrectable and the latter rendering the benefits of the treatment of little value over extended periods of production.

Related problems are encountered with so-called "thief" zones which deplete the drilling fluid when such zones are traversed during the drilling of oil wells. Similarly, strata having high permeability to water are frequently encountered adjacent to oil-bearing formations and thereby reduce the efficiency of secondary oil recovery by water-flooding techniques.

In a recent patent (U.S. Pat. No. 3,087,543) water production in oil-producing wells is inhibited by introducing into the oil well bore a solution of a water-soluble acrylamide carboxylic acid copolymer. Under pressure, this polymer solution is forced into the formation reducing the permeability of the formation to water with little or no decrease in the permeability of the same formation to oil. While numerous advantages are cited for the treatment, any beneficial effects achieved can only last for a relatively short time because of the inherent water solubility of the polymer.

It is an object of the present invention to provide an improved method for selectively blocking, or reducing, the production of aqueous fluids in an oil well. More particularly, it is an object to provide a sequential method for selectively establishing a substantially water-impermeable block in water-producing strata while at the same time leaving oil-producing strata effectively unhindered for oil production. A special object is to provide a water-blocking technique which can be reversed, if desired, so that any portion, or all, of the formation treated can be returned to its initial condition regarding permeability to fluid flow.

SUMMARY OF THE INVENTION

The present invention is directed to a method employing certain colloidal compositions for selectively controlling the flow of aqueous fluids in permeable subterranean formations. More particularly, the invention involves a particular sequential method for selectively forming in water-bearing strata compositions comprising an aqueous dispersion an immobile gel, said dispersion or gel being the reaction product of certain organic polymeric polyelectrolytes and water-insoluble, inorganic compounds.

According to the present invention, water permeable subterranean formations are rendered less permeable to the flow of water by the sequential application through a well bore penetrating said formation of a solution of a polyvalent metal ion followed by an aqueous mixture of certain polymers, including anionic and non-ionic water-soluble polymers and solid polymers in aqueous dispersion, it being understood that said dispersion dissolves before reaching the formation. The ions are washed or eluted into the subterranean water permeable formation or formations, and then the polymer is applied via the well bore.

A solution of a metal ion would be expected to move more easily through a formation than a polymer solution due to its lower viscosity. However, the rate at which said ions move is, in fact, retarded by their adsorption on the surface of the formation. This can be viewed as chromatographic migration, wherein certain components of a solution move more slowly than their solvent. Since the later-injected polymer moves through the formation at the true fluid velocity, it overtakes either the retarded soluble metallic ion and/or the insoluble metal hydroxide, and interacts with them to form an insoluble gel that inhibits water flow in that portion of the formation. Additionally, some precipitation of the soluble metal ion may occur at the interface between the polymer and the ion. Due to the fact that the chromatographing effect is greatest on the water-wet surfaces of the formation, the greatest frequency of gel formation occurs in those zones containing the greater concentration of water. The sequential treatment of the present invention, then, results in preferentially blocking the water channels while having little effect on the oil-containing portions of the formation.

Polyvalent ions such as iron, aluminum, chromium, copper, etc., can be applied to the formation in the form of water-soluble salts, such as sulfates, chlorides and the like, at a pH sufficiently low to retain the ions in solution. The formation contacted by the solution acts as a buffer, in that it gradually raises the pH, thereby precipitating the hydroxide of the above-mentioned ions. This, then, allows the polymer solution to overtake the salt of the metal ion and form a gel for diverting water flow.

Alternatively, when the polymer solution overtakes the soluble inorganic ions, which are slowed in their movement through the formation by the heretofore discussed chromatographing effect, the hydroxide of the ion or ions is precipitated by the polymer solution itself, if said solution originally has a pH above about 7, or if said pH condition is supplied in situ.

In order to avoid forming the reaction product too near the well bore, the ions may be eluted further into the formation by injecting water, at an appropriate pH (i.e., <3), before the polymer solution is injected.

Depending upon the concentration and nature of the polymeric polyelectrolyte and of the particular inorganic salt employed, the compositions formed by the method of this invention may vary in consistency from liquids somewhat more viscous than the polymer solutions used in their manufacture to thick slimes or pultaceous gels. In any case, however, each composition is characterized by a resistance factor, said factor being greater than the polymer solution from which the composition is prepared. For a definition of resistance factor, see my aforementioned co-pending Application and U.S. Pat. No. 3,399,725.

While the concentration of the metal ions is not particularly critical, since the ions are reconcentrated in the formation, generally an aqueous treatment concentration of from about 0.005 to 5.0 weight percent of inorganic ion is suitable. A polymer concentration in the treatment solution of from about 0.001 to about 0.5 weight percent is also generally suitable.

In their broadest scope, the compositions formed by the sequential method of the present invention are those aqueous dispersions wherein a water-insoluble inorganic solid is formed in an aqueous solution or dispersion of an organic polymeric polyelectrolyte, wherein said polyelectrolyte would normally flocculate said inorganic solid if the dispersion thereof had not been formed in the presence of said polyelectrolyte and wherein the finished aqueous composition is characterized by a resistance factor greater than the resistance factor for an aqueous solution containing the same concentration of polymeric polyelectrolyte without said inorganic solid. When the inorganic solid is formed immediately ahead of the polymer solution, the polymer combines with the solid to form a pultaceous coating on the surfaces in the formation and so inhibit further fluid flow.

Preferred inorganic solids for use in the compositions of the invention include the hydroxides of aluminum, chromium, iron, cadmium, cobalt, manganese, nickel, copper, tin and zinc. The exact physical nature of these so-called colloidal dispersions is not completely understood since there appears to be an interaction of the inorganic compound with the polymeric polyelectrolyte causing marked effects on the rheological properties of the finished dispersions.

Suitable organic polymeric polyelectrolytes are, in general, known flocculating agents characterized as substantially linear, high molecular weight polymers having sufficient polar groups in or along the polymer chain to render the polymer water-soluble. In the present context, high molecular weight means those polymers having molecular weights of at least about one million and preferably of over two million. In practice it is preferred to employ water-soluble polymers characterized by a viscosity of at least 4 centipoises, preferably at least 12 centipoises, for a 0.5 percent by weight solution of the polymer in distilled water at 25°C. Representative polymeric polyelectrolytes useful in the invention are water-soluble polymers of acrylamide, acrylic acid, sodium styrene-sulfonate and the like and copolymers of such monomers with each other or with other suitable monoethylenically unsaturated monomers such as ethylene, propylene, styrene, methacrylic acid, methacrylamide, vinyl alkanoic esters, vinyl chloride, maleic anhydride and the like. Other suitable polymeric polyelectrolytes are the polymers and copolymers of sodio-sulfoalkyl acrylates and methacrylates, aminoalkyl acrylates and methacrylates and water-soluble salts of copolymers of maleic anhydride with a vinyl-aromatic compound. Also suitable are heteropolysaccharides formed by the bacterial fermentation of carbohydrates, such as are described in U.S. Pat. No. 3,305,016. The preferred polymeric polyelectrolytes are high molecular weight polyacrylamides and hydrolyzed polyacrylamides.

If it is desired to restore the permeability of the treated formation, a simple chemical treatment will suffice. For instance, one may re-dissolve the inorganic portion of the reaction product by, for instance, changing the pH or contacting the gel with a chelating agent. The gel, then, will disperse, and its ability to retard flow in the formation will be limited to its viscosity effect.

Another method which may be employed to reverse the treatment of this invention is to degrade the polymer, thereby returning the formation to its original permeability characteristics. This may be accomplished by, for instance, contacting the treated formation with a strong oxidizing agent.

SPECIFIC EMBODIMENT

A small well is producing excess water and little oil. The following treatment is applied to the well:

One barrel of 15 percent (by weight) hydrochloric acid is diluted with 10 barrels of water. The resultant aqueous solution is injected into the producer well.

Twenty gallons of a 10 percent by weight aqueous solution of aluminum chloride are then mixed with 10 barrels of water. The pH of the resultant solution is adjusted to about 2. This aqueous solution is injected into the formation, followed by the injection of 20 barrels of water to push the aqueous solution well into the formation, and away from the well bore.

Two hundred barrels of a dilute aqueous solution containing about 0.1 weight percent of a 35 percent partially hydrolyzed polyacrylamide of at least about one million molecular weight is subsequently introduced into the formation.

Following the addition of the polyacrylamide solution, a slug of 40 barrels of water is used to push the solution into the formation. The reactants are then allowed to stand for 24 hours. After that period, the well is returned to its normal level of fluid production. Within several days, an increase in the average output of oil and a decrease in the average output of water is noticed.

I claim:

1. The method of selectively controlling the mobility of aqueous fluids in permeable subterranean formations which comprises injecting into said formation, through a well bore penetrating same, first a solution of a polyvalent metal ion followed by an aqueous mixture of an organic polymeric polyelectrolyte, thereby forming, as a reaction product, an aqueous dispersion and/or an immobile gel, said polymeric polyelectrolyte comprising polyacrylamide or hydrolyzed polyacrylamide.

2. A method according to claim 1 wherein the polymeric polyelectrolyte is employed at a concentration of from about 0.001 to about 0.5 weight percent of the solution or dispersion.

3. A method according to claim 1 wherein the metal ions are employed at a concentration of from about 0.005 to about 5.0 weight percent of the solution.

4. A method according to claim 1 wherein the metal ion is derived from a water-soluble salt of aluminum, chromium, iron, cadmium, cobalt, manganese, nickel, copper, tin or zinc.

5. A method according to claim 4 wherein the metal is aluminum or iron.

* * * * *